(12) United States Patent
Nikov et al.

(10) Patent No.: US 12,476,786 B2
(45) Date of Patent: Nov. 18, 2025

(54) STATISTICAL INEFFECTIVE FAULT ANALYSIS PROTECTION OF SBOX

(71) Applicant: NXP B.V., Eindhoven (NL)

(72) Inventors: Ventzislav Nikov, Haasrode (BE); Martin Heinrich Butkus, Hamburg (DE)

(73) Assignee: NXP B.V., Eindhoven (NL)

(*) Notice: Subject to any disclaimer, the term of this patent is extended or adjusted under 35 U.S.C. 154(b) by 177 days.

(21) Appl. No.: 18/529,845

(22) Filed: Dec. 5, 2023

(65) Prior Publication Data
US 2025/0184113 A1 Jun. 5, 2025

(51) Int. Cl.
H04L 29/06 (2006.01)
H04L 9/00 (2022.01)
H04L 9/06 (2006.01)

(52) U.S. Cl.
CPC ............ H04L 9/004 (2013.01); H04L 9/0618 (2013.01); H04L 9/0625 (2013.01); H04L 9/0631 (2013.01)

(58) Field of Classification Search
CPC ..... H04L 9/004; H04L 9/0631; H04L 9/0625; H04L 9/0618
See application file for complete search history.

(56) References Cited

U.S. PATENT DOCUMENTS

| | | | | |
|---|---|---|---|---|
| 2,895,583 | A * | 7/1959 | Lackey | G07F 5/18 221/6 |
| 10,171,234 | B2 * | 1/2019 | Michiels | H04L 9/14 |
| 11,190,340 | B2 * | 11/2021 | Dorrendorf | G06F 7/724 |
| 11,449,606 | B1 * | 9/2022 | Satpathy | G02B 27/0172 |
| 2002/0061107 | A1 * | 5/2002 | Tham | H04L 63/0428 380/259 |
| 2002/0101986 | A1 * | 8/2002 | Roelse | H04L 9/0618 380/42 |
| 2003/0235301 | A1 * | 12/2003 | Hanounik | H04L 9/0625 380/37 |
| 2005/0271201 | A1 * | 12/2005 | Shimizu | H04L 9/004 380/28 |
| 2008/0276106 | A1 * | 11/2008 | Sato | G06F 7/00 713/320 |

(Continued)

OTHER PUBLICATIONS

J. Breier, M. Khairallah, X. Hou and Y. Liu, "A Countermeasure Against Statistical Ineffective Fault Analysis," in IEEE Transactions on Circuits and Systems II: Express Briefs, vol. 67, No. 12, pp. 3322-3326, Dec. 2020, doi: 10.1109/TCSII.2020.2989184.

(Continued)

*Primary Examiner* — Dao Q Ho

(57) ABSTRACT

A protection circuit for a Sbox, including: a first check circuit configured to determine if a most significant bit (MSB) part input into a first multiplier of the Sbox is zero; a second check circuit configured to determine if a CCn value input into the first multiplier and a second multiplier of the Sbox is zero; a third check circuit configured to determine if a least significant bit (LSB) part input into a first multiplier of the Sbox is zero; and a first Statistical Ineffective Fault Analysis (SIFA) logic circuit configured to produce a first output to indicate a SIFA attack when one of the following conditions is satisfied: both the MSB part and the LSB part are zero and the CCn value is not zero: or the CCn value is zero and either of the MSB part and LSB part are not zero.

20 Claims, 5 Drawing Sheets

(56) References Cited

U.S. PATENT DOCUMENTS

| | | | | |
|---|---|---|---|---|
| 2009/0103716 | A1* | 4/2009 | Shirai | H04L 9/002 380/28 |
| 2010/0061548 | A1* | 3/2010 | Shirai | H04L 9/0625 380/28 |
| 2010/0104093 | A1* | 4/2010 | Shirai | H04L 9/0625 380/28 |
| 2012/0250854 | A1* | 10/2012 | Danger | H04L 9/003 380/28 |
| 2015/0172043 | A1* | 6/2015 | Li | H04L 9/16 380/30 |
| 2016/0182227 | A1* | 6/2016 | Michiels | H04L 9/06 380/28 |
| 2021/0152329 | A1* | 5/2021 | Subbumurugesan | H03M 13/091 |
| 2021/0264061 | A1* | 8/2021 | Kim | G06F 21/78 |
| 2024/0333472 | A1* | 10/2024 | Kumar | G09C 1/00 |
| 2024/0405970 | A1* | 12/2024 | Hinckley | G06F 30/323 |
| 2025/0112759 | A1* | 4/2025 | Kumar | H04L 9/0631 |
| 2025/0184113 | A1* | 6/2025 | Nikov | H04L 9/004 |

OTHER PUBLICATIONS

Daemen, Joan, et al. Protecting against statistical ineffective fault attacks. 2020. IACR Transactions on Cryptographic Hardware and Embedded Systems, ISSN 2569-2925, vol. 2020, No. 3, pp. 508-543.

Amir Moradi et al: Impeccable Circuits; https://eprint.iacr.org/2018/203.

Amir Moradi et al: Impeccable Circuits II; https://eprint.iacr.org/2019/1369.

Amir Moradi et al: Impeccable Circuits III; https://eprint.iacr.org/2021/1568.

Mustafa Khairallah et al., "On Comparison of Countermeasures Against Statistical Ineffective Fault Attacks," IEEE 978-1-7281-4058-2/19, 2019, pp. 122-125.

Haruka Hirata et al., "All You Need Is Fault: Zero-Value Attacks on AES and a New λ-Detection M&M," https://doi.org/10.46586/tches.v2024.i1.133-156, Dec. 4, 2023.

Canright D.; "A Very Compact S-Box for AES"; CHES'05: Proceedings of the 7th International Conference on Cryptographic Hardware and Embedded Systems; pp. 441-455; Published Aug. 29, 2005; https://doi.org/10.1007/11545262_32 (Applicant submitted the 15 page NPL on Jan. 5, 2025. The correct NPL PDF document was downloaded in Patent Center, but the citation was entered incorrectly on the IDS form—Jan. 5, 2025 NPL entry 1.

Joshi, Priyanka et al.; "SSFA: Subset fault analysis of ASCON-128 authenticated cipher"; Microelectronics Reliability Volume 123 (2021) 114155; Revised Jan. 20, 2021; Accepted May 9, 2021; https://doi.org/10.1016/j.microrel.2021.114155.

D. Canright, 2004, "A Very Compact Rijndael Sbox".

L. De Meyer et al., 2018, "Multiplicative Masking for AES in Hardware".

C. Dobrauning et al., 2018, "SIFA: Exploiting Ineffective Fault Inductions on Symmetric Cryptography".

Dworkin, M. J., et al. "Advanced Encryption Standard (AES), NIST FIPS-197." (2000).

* cited by examiner

STATISTICAL INEFFECTIVE FAULT ANALYSIS PROTECTION OF SBOX

FIELD OF THE DISCLOSURE

Various exemplary embodiments disclosed herein relate to statistical ineffective fault analysis protection of Sbox.

BACKGROUND

AES is used worldwide as a symmetric encryption protocol to protect communications. AES may be implemented in various ways and in software or hardware. AES includes the use of a bijective substitution box (Sbox) to provide nonlinearity in the encryption/decryption process. This Sbox takes an 8-bit input and produces an 8-bit output. The Sbox may be implemented using a lookup table, but a more efficient and compact implementation has been developed called the Canright Sbox. The Canright Sbox may be used in various applications where resources are limited.

SUMMARY

A summary of various exemplary embodiments is presented below.

Various embodiments relate to a protection circuit for a Sbox, including: a first check circuit configured to determine if a most significant bit (MSB) part input into a first multiplier of the Sbox is zero; a second check circuit configured to determine if a CCn value input into the first multiplier and a second multiplier of the Sbox is zero; a third check circuit configured to determine if a least significant bit (LSB) part input into a first multiplier of the Sbox is zero; and a first Statistical Ineffective Fault Analysis (SIFA) logic circuit configured to produce a first output to indicate a SIFA attack when one of the following conditions is satisfied: both the MSB part and the LSB part are zero and the CCn value is not zero: or the CCn value is zero and either of the MSB part and LSB part are not zero.

Various embodiments are described, further including: a register; and an OR gate, wherein the OR gate is configured to OR an output of the SIFA logic circuit and an output of the register, and wherein the output of the OR gate is fed into the register.

Various embodiments are described, wherein the Sbox is a Canright Sbox.

Various embodiments are described, further including: a fourth check circuit configured to determine if an MSB part input into a first multiplier of the Sbox is zero; a fifth check circuit configured to determine if a CCn value input into the first multiplier and a second multiplier of the Sbox is zero; a sixth check circuit configured to determine if an LSB part input into a first multiplier of the Sbox is zero; a second Statistical Ineffective Fault Analysis (SIFA) logic circuit configured to produce a second output to indicate a SIFA attack when one of the following conditions is satisfied: both the MSB part and the LSB part are zero and the CCn value is not zero: or the CCn value is zero and either of the MSB part and LSB part are not zero; and an AND gate configured to AND the first output and the second output to indicate a SIFA attack.

Further various embodiments relate to a protected Sbox circuit, including: a plurality of most significant bits (MSB) registers configured to propagate MSB of an input to the Sbox circuit; a plurality of least significant bits (LSB) registers configured to propagate LSB of an input to the Sbox circuit; a plurality of combinatorial circuits (CC) and CC registers configured to process the LSB and MSB of the input to produce a CCn output; a first Statistical Ineffective Fault Analysis (SIFA) detector circuit configured to produce a first output to indicate a SIFA attack; a second SIFA detector circuit configured to produce a second output to indicate a SIFA attack; and an AND gate configured to AND the first output and the second output to indicate a SIFA attack, wherein the first SIFA detector circuit and the second SIFA detector circuit each include: a first check circuit configured to determine if the MSB output from a last register of the plurality of MSB registers is zero; a second check circuit configured to determine if the CCn value is zero; a third check circuit configured to determine if the LSB output from a last register of the plurality of LSB registers is zero; and a Statistical Ineffective Fault Analysis (SIFA) logic circuit configured to produce an output to indicate a SIFA attack when one of the following conditions is satisfied: both the MSB and the LSB are zero and the CCn value is not zero: or the CCn value is zero and either of the MSB and LSB are not zero.

Various embodiments are described, the first SIFA detector circuit and the second SIFA detector circuit each further include: a register; and an OR gate, wherein the OR gate is configured to OR an output of the SIFA logic circuit and an output of the register, and
  wherein the output of the OR gate is fed into the register.

Various embodiments are described, wherein the Sbox is a Canright Sbox.

Further various embodiments relate to a protected Sbox circuit, including: a plurality of first duplicate registers configured to propagate duplicate values of a first half of bits of an input to the Sbox circuit; a plurality of second duplicate registers configured to propagate duplicate values of a second half of the bits of the input to the Sbox circuit, wherein the first half of the bits is one of most significant bits (MSB) or least significant bits (LSB); a plurality of combinatorial circuits (CC) and CC registers configured to process the first and second halves of the input to produce a CCn output; a first check circuit configured to produce a first check output wherein the first check output is equal to a non-zero value when the input is zero and the first check output is equal to zero when the input is not equal to zero; a second check circuit configured to produce a second check output wherein the second check output is equal to a non-zero value when the input is zero and the second check output is equal to zero when the input is not equal to zero; a first AND gate configured to AND the first check output and the second check output to produce a first AND output; a second AND gate configured to AND the first check output and the second check output to produce a second AND output; a first XOR gate configured to XOR the first AND output with a first duplicate of the first half of an input to produce a first XOR output, wherein the first XOR output is connected to a first input of a first duplicate register of the plurality of first duplicate registers; a second XOR gate configured to XOR the second AND output with a second duplicate of the first half of an input to produce a second XOR output, wherein the second XOR output is connected to a second input of the first duplicate register;

a first comparator configured to compare first and second duplicate values of the first half of the input stored in a last of the first duplicate registers and to produce a first comparator output; and a second comparator configured to compare first and second duplicate values of the second half of the input stored in the last of the second duplicate registers and to produce a second comparator output, wherein the first and second comparator outputs are indicative of a Statistical Ineffective Fault Analysis (SIFA) attack.

Various embodiments are described, wherein the Sbox is a Canright Sbox.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Figure 1:
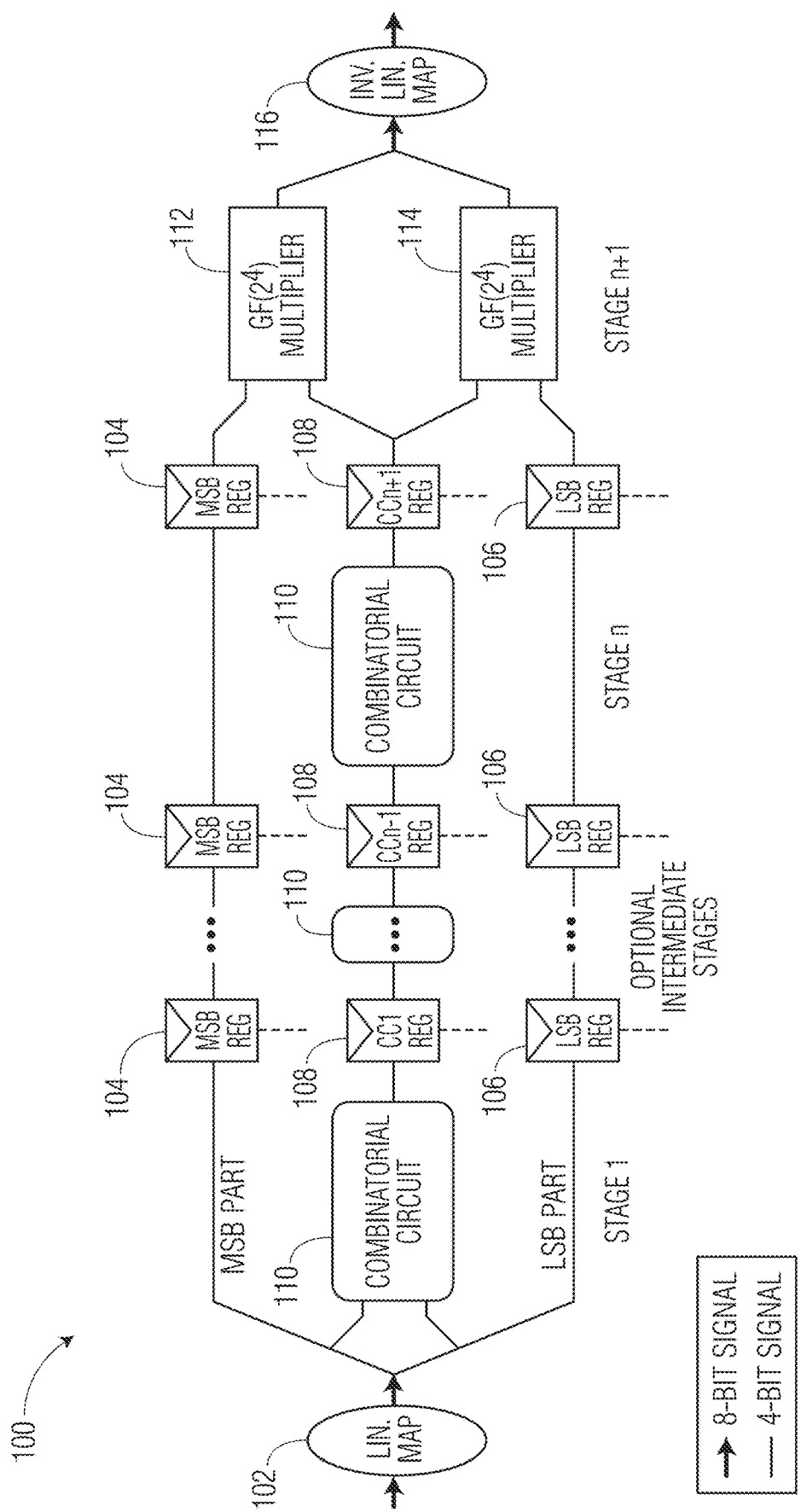
FIG. 1 illustrates a block diagram of an implementation of the Canright Sbox.

This disclosure proposes an embodiment of a specific detection mechanism as a protection against Statistical Ineffective Fault Analysis (SIFA) attacks on Sboxes. The example presented herein uses the Canright Advanced Encryption Standard (AES) substitution-box (Sbox) to illustrated the detection method. The detection method may be applied to other Sboxes as well. It is assumed that Differential Fault Analysis (DFA) protection is in place to counter DFA attacks. One embodiment proposes a circuit to monitor the inputs to the final multiplier stage of the Sbox, for inputs that can give rise to a zero-value bias that is exploitable with SIFA. Based on the detection of such events, appropriate measures may be taken to prevent the exploit. The AES Sbox may be implemented in many different ways. One of the most used Application Specific Integrated Circuit (ASIC) implementations is the so-called Canright implementation in which the operations are performed according to the tower field approach that includes scaling down from inversion in $GF(2^8)$ to operations in $GF(2^4)$ or even $GF(2^2)$. FIG. 1 illustrates a block diagram of an implementation of the Canright Sbox. The Canright Sbox 100 is a bijective non-linear mapping of an 8-bit input into an 8-bit output. The Canright Sbox 100 first applies a linear mapper 102 to the input. The output of the linear mapper 102 is then split into a 4-bit most significant bits (MSB) part and a 4-bit least significant bits (LSB) part. The Canright Sbox 100 includes three paths. The first path includes a series of MSB registers 104 that propagate the MSB part through the Canright Sbox 100. The second or central path includes a series of combinatorial circuits (CC) 110 and CC registers 108 that receive both the MSB part and LSB part, and the second path produces a CC part. The third path includes a series of LSB registers 106 that propagate the LSB part through the Canright Sbox 100.

A MSB multiplier 112 multiplies together the MSB part and the CC part. A LSB multiplier 114 multiplies together the LSB part and the CC part. The outputs of MSB multiplier 112 and LSB multiplier 114 are then concatenated and input into an inverse linear map 116.

While a lookup table may be used to implement the AES Sbox, the Canright Sbox 100 is a compact and efficient implementation of the AES Sbox. An important observation regarding the Canright Sbox is that the MSB and LSB parts (4 bit) of the input are carried out until the last stage n without modifications while the computations are performed in the central path (4 bit).

For Side Channel Analysis (SCA) protection the operations in the Sbox are usually performed over shared (masked) data, where the number of shares may differ depending on the security order targeted. For Fault Injection Attack (FIA) protection, a standard protection is to double either in space or in time the calculations, and this method also resists DFA attacks.

However, SIFA fault attacks were proposed in 2018 where one introduces ineffective fault (i.e., a fault in which the end ciphertext is still correct) and with certain statistical methods allow the adversary to deduce a sensitive internal value (even against implementations which are masked and use duplications). Because traditional fault countermeasures (such as redundant calculations) do not protect against this type of fault attack, SIFA attacks are a serious threat against which specific countermeasures and hardenings are called for.

The standard Canright AES Sbox design is susceptible to SIFA attacks, primarily due to the final multiplier stage, consisting of two GF(16) multipliers MSB multiplier 112 and LSB multiplier 114. The effect of a fault injection is dependent on the input of the Sbox.

If it is assumed that the Sbox input value is zero, then, by construction of the Canright Sbox, the MSB, LSB, and CCn values will be zero (in the absence of a fault injection). If a fault injection corrupts only one of these factors, MSB, LSB, or CCn then the result from the multiplications will not be affected, because it will still be zero because of the other factor being zero. As a result the output of the Sbox is not affected by the fault, i.e., it is ineffective.

However, if the input of the Sbox is non-zero, then by construction, at least two out of the three factors, MSB, LSB, and CCn, will be non-zero. Consequently, the same fault, corrupting one of the factors, will now affect the output of the Sbox, i.e., it is effective. For an inverse Sbox (used in decryption), the special input would be a different value, 0x63, which again translates to MSB=LSB=CCn=0.

Figure 2A:
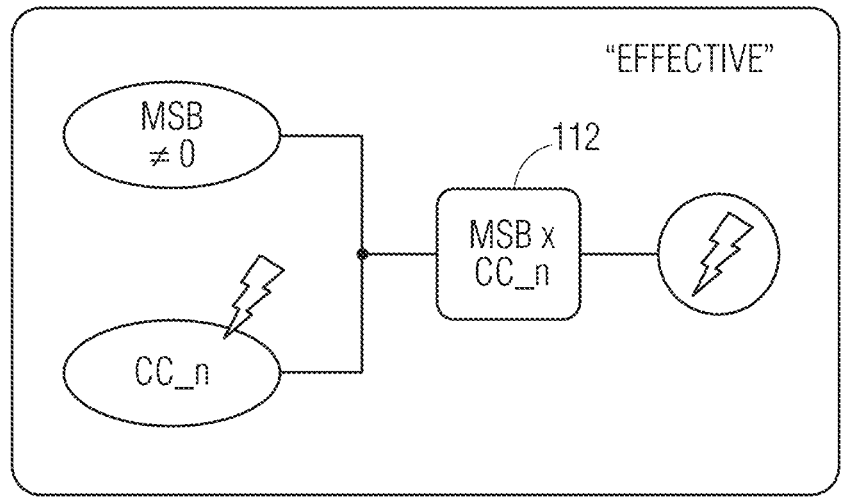
FIG. 2A illustrates an example of an effective attack.
Figure 2B:
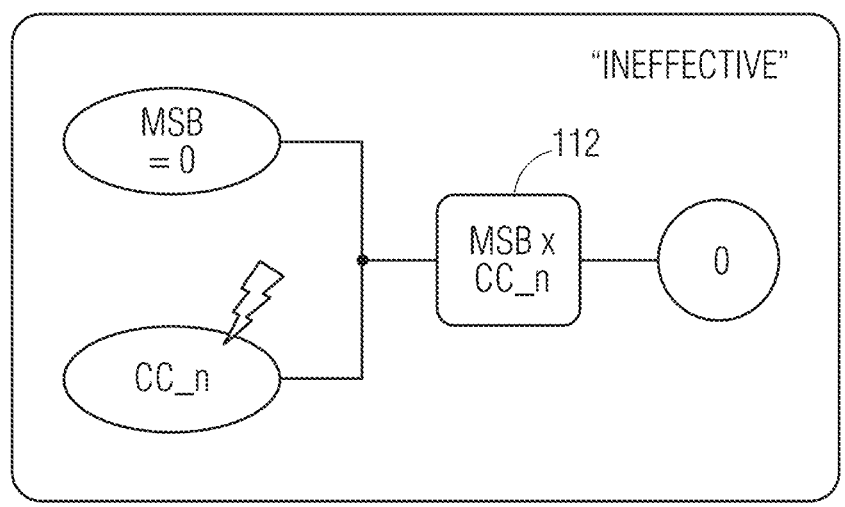
FIG. 2B illustrates an example of an ineffective attack.

FIG. 2A illustrates an example of an "effective" attack. In this case the MSB part is not equal to zero, and the CC part is changed. As a result the output will be changed. FIG. 2B illustrates an example of an "ineffective" attack. In this case the MSB is equal to zero, and the CC part is changed. In this case, the output is still zero even though the CC part has been changed. This means that the observation of an "ineffective" fault (no corruption of the Sbox output, hence no corruption of the ciphertext) is a function of the Sbox input.

An adversary who can somehow recognize whether or not the ciphertext is corrupted, can correlate the input or output data for the ciphertexts which are not corrupted, and deduce the key with SIFA. A DFA countermeasure, such as redundant calculation, would allow an attacker to recognize corruption of the ciphertext.

An embodiment of a specific detection mechanism as a protection against this SIFA attack on Canright Sbox will now be described. This embodiment includes a circuit to monitor the inputs to the final multiplier stage, including MSB multiplier 112 and LSB multiplier 114 in FIG. 1, for inputs that may give rise to a zero-value bias as described above. Specifically, the detector circuit monitors the inputs to the GF16 multipliers MSB multiplier 112 and LSB multiplier 114 and produces an alarm if one or several of the following conditions hold:

the MSB and LSB factors are zero, and the CCn factor is non-zero;
the CCn factor is zero, and the MSB is non-zero; or
the CCn factor is zero, and the LSB is non-zero.

The response to such an event should be such that an adversary must not be able to distinguish this "ineffective" fault (Sbox input value zero) from an "effective" fault (where the input value is nonzero). This response may be achieved in various ways. A first approach includes assuming the AES is protected by a standard DFA countermeasure, such as redundant calculation, where it may be adequate to corrupt the ciphertext deliberately. This would allow the DFA countermeasure to trigger both: for an Sbox input of zero and for any other value. A second approach would include, the error handling could take both the DFA and SIFA errors into consideration and abort the AES calculation. In any case, it must be assured that even with side channel analysis, it will not be possible to distinguish a SIFA detection event (input value of zero) from an "effective" fault that corrupts the ciphertext (other input value).

A scheme is further proposed to protect the SIFA detector itself from a SIFA attack, i.e., an attack targeting a single component (SIFA detector, or the Sbox) of the SIFA detector. This may be achieved by duplication of the SIFA circuit and combining the result with a logical AND.

Figure 3:
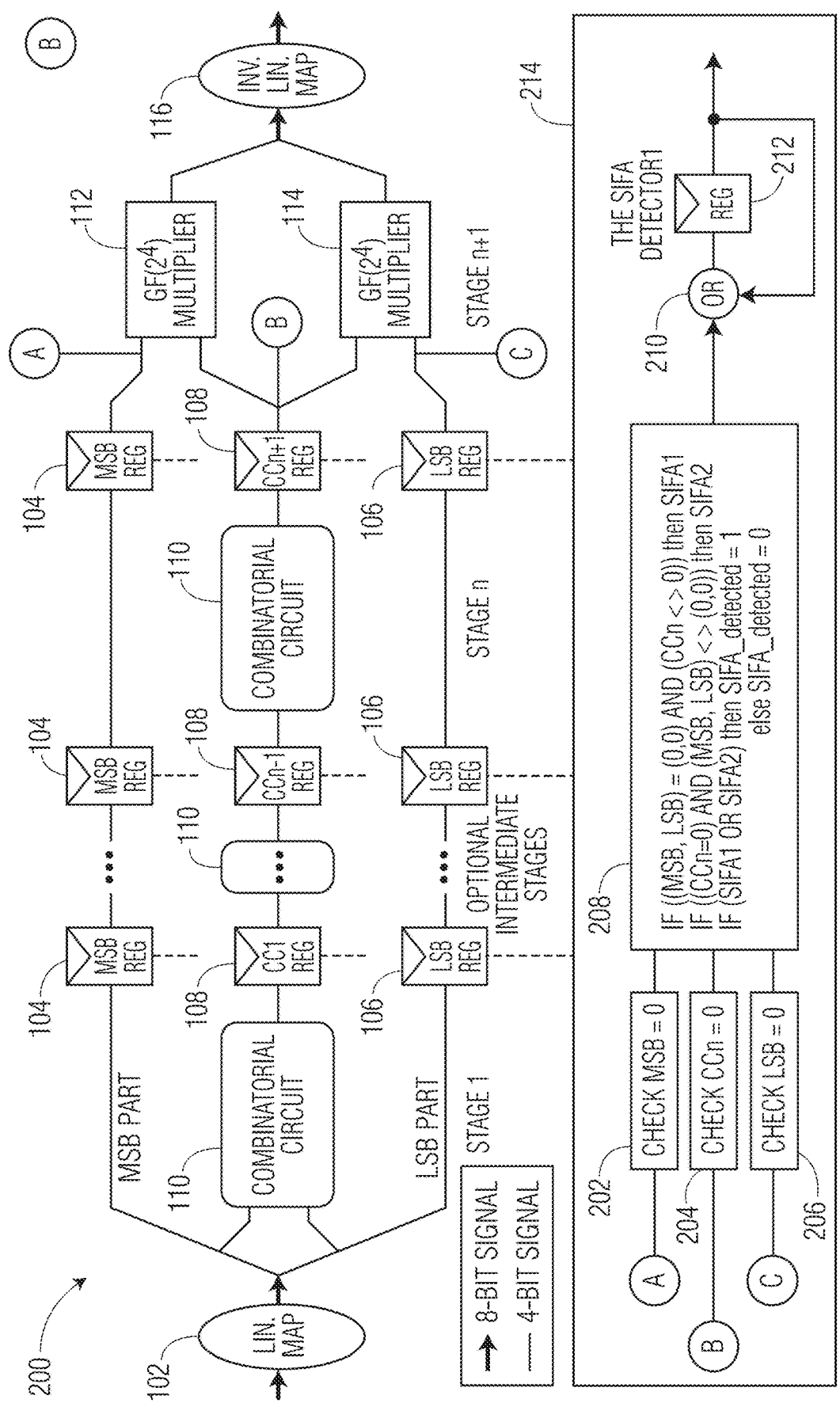
FIG. 3 illustrates an embodiment of SIFA detector for a Canright Sbox.

FIG. 3 illustrates an embodiment of SIFA detector for a Canright Sbox. The various elements of the Canright Sbox in FIG. 3 are the same as in FIG. 1. In FIG. 3 a SIFA detector 214 is added to the Canright Sbox.

The operation of the SIFA detector 214 is based upon the following observations. The correctness of the Sbox input is checked to determine if it is 0, i.e., in that case it is expected that the triple (MSB, CCn, LSB) will be (0, 0, 0). In other words the detector checks whether triples like (0,x,0), (x,0, 0), (0,0,x), (x,0,x) occur (where x denotes any nonzero value and multiple instances of x may have different values), which are impossible (without a fault) situations, i.e., those are only possible as result of FIA. For the cases, (0,x,x), (x,x,x), (x,x,0), these combinations will not trigger a SIFA alarm. This is not necessary, because in all of these cases, a fault that corrupts any one of the factors LSB, the CCn or the MSB, would propagate through the multiplier stage, and affect the output of the SBOX (and consequently, change the output of the encryption). Hence, any such fault would be detected by standard DFA countermeasures, such as double calculation, or similar countermeasure. In the case of (0,0,0), this is also not triggering a SIFA alarm, because it is a valid combination for the SBOX input of zero if there is no fault injection. However, a fault leading to corruption of any one of the MSB, CCn or LSB factors would lead to a combination of (x,0,0), (0,x,0), (0,0,x) and therefore the detector would trigger a SIFA alarm.

So when (0,x,0), (x,0,0), (0,0,x), (x,0,x) values are detected at stage n of the Canright Sbox 100 then SIFA alarm in raised. The check is performed in two steps. The first is to check whether a 4-bit value is zero or non-zero. In one embodiment a Dirac delta function may be used that returns true (for zero input) or false (otherwise). For simplicity we will denote this function output bit as MSB, LSB and CCn. Then checking these 4 cases (0,x,0), (x,0,0), (0,0,x), (x,0,x) as a second step is simple Boolean expression. The check for the Sbox input may be performed using these 2 steps.

An advantage of this way of executing the detection is that now the check or Dirac delta function is applied to a 4 bit value (instead of the 8 bit value—the input to the Sbox) so it requires less logic area and levels (so it is faster). The Dirac delta function outputs a value of 1 if the input is zero, otherwise the Dirac delta function outputs a 0 when the input is nonzero. An additional benefit is that the check is not on the critical path (only performed at stage n) and the Sbox result is ready exactly (as initially done) on stage n while the SIFA check can come a bit later (if it takes several stages). In addition, all these checks (the 2 steps) can be performed efficiently also when the data is in shared form (for side channel analysis protection).

The SIFA detector 214 receives the MSB, CCn, and LSB values from the last stage of the Canright Sbox 100. MSB check 202 checks to see if MSB equals zero. CC check 204 checks to see if CCn equals zero. LSB check 206 checks to see if LSB equals zero. These checks are then used by SIFA logic 208 to determine if a SIFA fault is detected. The Boolean logic described above to carry out this check may be implemented using the following set of logical statements.

If ((MSB,LSB)=(0,0) AND (CCn< >0)) then SIFA1
If ((CCn=0) AND (MSB, LSB)< >(0,0)) then SIFA2
IF (SIFA1 or SIFA2) then SIFA_detected=1
else SIFA_detected=0.

The output of SIFA logic 208 is ORed with the output of a SIFA register 212 by OR gate 210, and the output of the OR gate 210 is stored in the SIFA register 212. This allows for the SIFA error to be latched and held until the end of the AES calculation when it may be reset.

Figure 4:
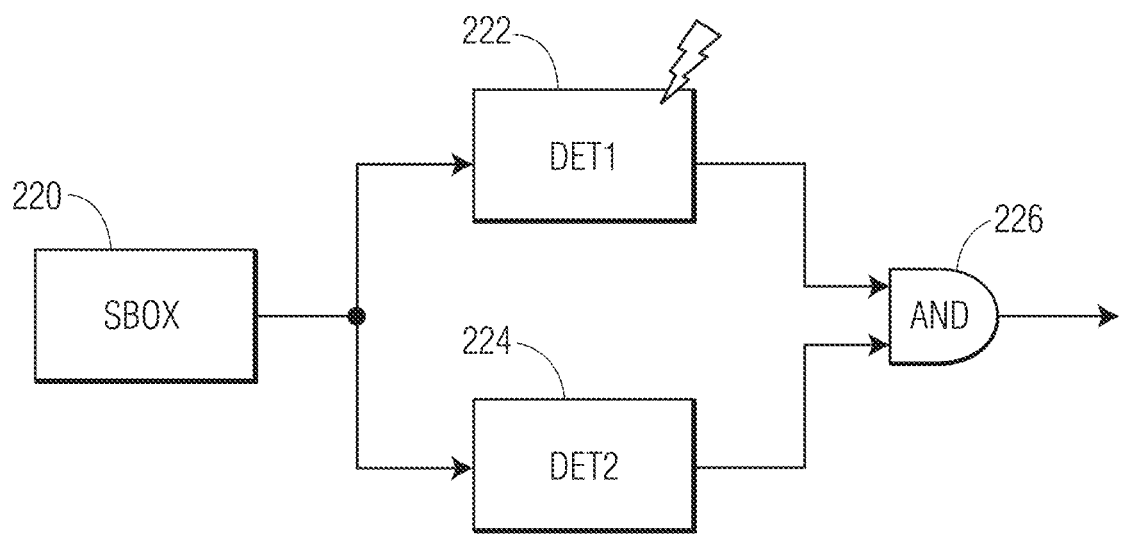
FIG. 4 illustrates SIFA detector protection system.

So far it has been explained how to protect the Sbox from a SIFA attack. But as mentioned above, the SIFA detector itself needs to be protected from a SIFA attack, targeting a single component (SIFA detector, or the Sbox). This can be achieved by duplication of the SIFA detection circuit and combining the result with a logical AND. FIG. 4 illustrates SIFA detector protection system. The SIFA detector protection system includes Sbox 220, first SIFA detector 222, second SIFA detector 224, and AND gate 226. Here the first SIFA detector 222 and second SIFA detector 224 includes MSB check 202, CC check 204, LSB check 206, and SIFA logic 208, and the gate 210 and a SIFA register 212 would be applied after the gate 226. A single fault injection can either target the Sbox 220 (leaving the detectors 222 or 224 working correctly), one of the SIFA detector 222 instances, or the AND gate 226. Faulting the AND gate 226, will not be exploitable, because it will produce a false alarm regardless of the input to the Sbox 220. A fault on one of the SIFA detectors 222 or 224 will not propagate to the output, because the other detector is not affected by the fault. As a result, the SIFA detector is protected against fault injection attack, targeting only one of the two SIFA detector instances.

Figure 5:
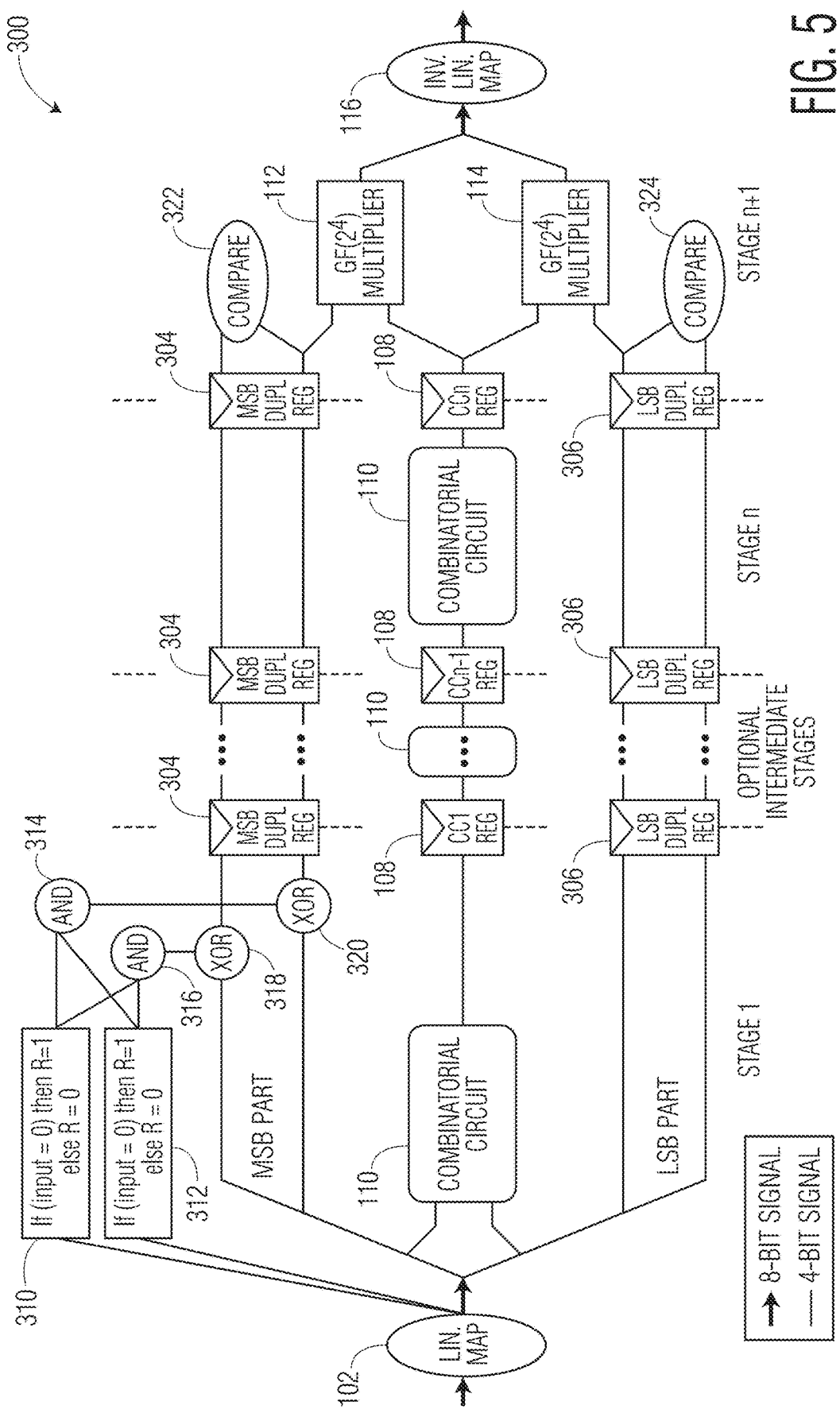
FIG. 5 illustrates another embodiment of SIFA detector for a Canright Sbox.

FIG. 5 illustrates another embodiment of SIFA detector for a Canright Sbox. The various elements of the Canright Sbox in FIG. 5 are similar as for the Canright Sbox in FIG. 1. This SIFA detector embodiment uses input values for SIFA detection. In FIG. 5 a SIFA detector is added to the Canright Sbox that includes input check 310, input check 312, AND gate 314, AND gate 316, XOR gate 318, XOR gate 320, MSB comparator 322, and LSB comparator 324. Also note that MSB registers 104 and LSB registers 106 in FIG. 1 have been replaced by MSB duplicate register 304 and LSB duplicate register 306, respectively, in FIG. 3. MSB duplicate register 304 and LSB duplicate register 306 each store duplicates of the data received so as to be able to detect attacks on the registers.

The Canright Sbox with SIFA protection 300 monitors not the last stage of the Canright Sbox as in FIG. 2, but monitors the input to the Sbox, specifically the MSB and/or LSB values after the initial linear map and that would deliberately corrupt one or two out of three factors of the final multipliers stage. This way, a corruption in the middle factor (CCn) would propagate to the output and no longer would be an ineffective fault.

The goal is to avoid the situation that leads to a zero-value bias. If the Sbox input is zero, then the final multiplier stage would normally see a zero on both factors, i.e., the LSB and MSB. The attacker could corrupt one factor without changing the result. This leads to an "ineffective" fault, and the situation is different, if the Sbox input is nonzero.

The logic of the Canright Sbox with SIFA protection 300 ensures that if the Sbox input is zero, one factor is already changed to non-zero for at least one of the multipliers. That means that if the fault injection corrupts the middle factor, the changed fault will propagate to the output. The fault will no longer be ineffective, which is a precondition for SIFA. Input check 310 and input check 312 each determine if the input is zero or not. If the input is zero, the check outputs a value R=1, otherwise it outputs R=0. Then, AND gate 314 and AND gate 316 each AND the outputs of input check 310 and input check 312. The XOR gate 318 and XOR gate 320 each XOR the output from AND gate 314 and AND gate 316 respectively with the duplicated MSB part of the input. These duplicated values then propagate through the MSB duplicate register 304. The detector logic is protected by duplicating the detector logic (input check 310 and input check 312), and combining the outputs with an AND gate (AND gate 314 and AND gate 316). This means that a fault on just one of the detectors, will never have any effect, and therefore SIFA is not possible.

The AND gate 314, AND gate 316, XOR gate 318, XOR gate 320 are protected by ensuring that these gates are duplicated, and each gate is connected only to one of the duplicate registers. A fault on any of these gates will always be detected, because such a fault corrupts just one copy of the duplicated register sets. This detection does not depend in any way on the input value of the Sbox, i.e., there is no bias and SIFA is not possible.

This logic only protects a corruption of the middle factor from SIFA attacks. However, the outer factors also need to be protected, in particular, the values in pipeline registers. This is done, in this example, with a simple duplication, i.e., MSB duplicate register 304 and LSB duplicate register 306, and comparators, i.e., MSB comparator 322 and LSB comparator 324. Therefore, any corruption would be detected (regardless of the Sbox input value), and so SIFA is not possible. The MSB comparator 322 compares the two values output from the final 304. The LSB comparator 324 compares the values output from the final LSB duplicate register 306. Therefore the logic only protects a corruption of the middle factor from SIFA attacks.

In the embodiment of FIG. 5 the check is done on the MSB part, but the check may instead be performed on the LSB part.

While the embodiments described herein use a Canright AES Sbox, the methods of the embodiment may be applied to Sboxes in other ciphers such as for example, the Chinese SM4, the Korean Seed, etc. Such an alternative Sbox would be an affine equivalent to the multiplicative inversion in a given finite field with the property that if the input of the Sbox is non-zero, then by construction, the factor CCn, as well as at least one of the other factors, MSB and, LSB, will be non-zero. Consequently, the same fault, corrupting one of the factors, will now affect the output of the Sbox.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Unless otherwise indicated, all numbers expressing parameter values and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained by embodiments of the present disclosure. As used herein, "about" may be understood by persons of ordinary skill in the art and can vary to some extent depending upon the context in which it is used. If there are uses of the term which are not clear to persons of ordinary skill in the art, given the context in which it is used, "about" may mean up to plus or minus 10% of the particular term.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:

1. A protected substitution box (Sbox) circuit, comprising:
a plurality of first duplicate registers configured to propagate duplicate values of a first half of bits of an input to the Sbox circuit;
a plurality of second duplicate registers configured to propagate duplicate values of a second half of the bits of the input to the Sbox circuit, wherein the first half of the bits is one of most significant bits (MSB) or least significant bits (LSB);
a plurality of combinatorial circuits (CC) and CC registers configured to process the first and second halves of the input to produce an nth combinatorial circuits (CCn) output;
a first check circuit configured to produce a first check output wherein the first check output is equal to a non-zero value when the input is zero and the first check output is equal to zero when the input is not equal to zero;
a second check circuit configured to produce a second check output wherein the second check output is equal to a non-zero value when the input is zero and the second check output is equal to zero when the input is not equal to zero;
a first AND gate configured to AND the first check output and the second check output to produce a first AND output;
a second AND gate configured to AND the first check output and the second check output to produce a second AND output;
a first XOR gate configured to XOR the first AND output with a first duplicate of the first half of the input to produce a first XOR output, wherein the first XOR output is connected to a first input of a first duplicate register of the plurality of first duplicate registers;
a second XOR gate configured to XOR the second AND output with a second duplicate of the first half of the input to produce a second XOR output, wherein the second XOR output is connected to a second input of the first duplicate register;
a MSB comparator configured to compare first and second duplicate values of the first half of the input stored in a last of the first duplicate registers and to produce a MSB comparator output; and
a LSB comparator configured to compare first and second duplicate values of the second half of the input stored in the last of the second duplicate registers and to produce a LSB comparator output,
wherein the first and second comparator outputs are indicative of a Statistical Ineffective Fault Analysis (SIFA) attack.

2. The protection circuit of claim 1, wherein the Sbox is a Canright Sbox.

3. The protection circuit of claim 1, wherein duplication provided by the first check circuit and the second check circuit and combining the outputs with the first AND gate and the second AND gate prevents a fault at one of the first check circuit or the second check circuit from enabling a Statistical Ineffective Fault Analysis (SIFA) attack.

4. The protection circuit of claim 1, wherein a Statistical Ineffective Fault Analysis (SIFA) attack is detected by:
duplication provided by the first AND gate, the second AND gate, the first XOR gate, and the second XOR gate; and connection of each gate to only one of the plurality of first duplicate registers or the plurality of second duplicate registers.

5. The protection circuit of claim 4, wherein a fault at any one of the first AND gate, the second AND gate, the first XOR gate, and the second XOR gate is detected because just one copy of the plurality of first duplicate registers or the plurality of second duplicate registers is corrupted by the fault.

6. The protection circuit of claim 4, wherein the SIFA attack is detected independent of the input to the Sbox.

7. The protection circuit of claim 1, wherein a Statistical Ineffective Fault Analysis (SIFA) attack is detected based on the first comparator and the second comparator detecting corruption in the plurality of first duplicate registers or the plurality of second duplicate registers.

8. The protection circuit of claim 7, wherein the SIFA attack is detected independent of the input to the Sbox.

9. The protection circuit of claim 7, wherein the corruption is detected on the MSB.

10. The protection circuit of claim 7, wherein the corruption is detected on the LSB.

11. The protection circuit of claim 1, wherein the Sbox comprises one of a Chinese SM4 or a Korean Seed.

12. A method of detecting a Statistical Ineffective Fault Analysis (SIFA) attack on a substitution box (Sbox) circuit, the method comprising:
propagating duplicate values of a first half of bits of an input to the Sbox circuit from plurality of first duplicate registers;
propagating duplicate values of a second half of the bits of the input to the Sbox circuit from a plurality of second duplicate registers configured to, wherein the first half of the bits is one of most significant bits (MSB) or least significant bits (LSB);
processing the first and second halves of the input using a plurality of combinatorial circuits (CC) and CC registers to produce an nth combinatorial circuits (CCn) output;
producing a first check output based on the input using a first check circuit, wherein the first check output is equal to a non-zero value when the input is zero and the first check output is equal to zero when the input is not equal to zero;
producing a second check output based on the input using a second check circuit, wherein the second check output is equal to a non-zero value when the input is zero and the second check output is equal to zero when the input is not equal to zero;
producing, using a first AND gate, a first AND output based on a logical AND of the first check output and the second check output;
producing, using a second AND gate, a second AND output, based on a logical AND of the first check output and the second check output;
performing a first XOR operation using a first XOR gate configured to XOR the first AND output with a first duplicate of the first half of the input to produce a first XOR output, wherein the first XOR output is connected to a first input of a first duplicate register of the plurality of first duplicate registers;
performing a second XOR operation using a second XOR gate configured to XOR the second AND output with a second duplicate of the first half of the input to produce a second XOR output, wherein the second XOR output is connected to a second input of the first duplicate register;
comparing, using a MSB comparator, first and second duplicate values of the first half of the input stored in a last of the first duplicate registers to produce a MSB comparator output; and
comparing, using a LSB comparator, first and second duplicate values of the second half of the input stored in the last of the second duplicate registers to produce a LSB comparator output,
wherein the first and second comparator outputs are indicative of a Statistical Ineffective Fault Analysis (SIFA) attack.

13. The method of claim 12, wherein the Sbox is one of Canright Sbox, a Chinese SM4, or a Korean Seed.

14. The method of claim 12, wherein duplication provided by the first check circuit and the second check circuit and combining the outputs with the first AND gate and the second AND gate prevents a fault at one of the first check circuit or the second check circuit from enabling a Statistical Ineffective Fault Analysis (SIFA) attack.

15. The method of claim 1, wherein a Statistical Ineffective Fault Analysis (SIFA) attack is detected by:
duplication provided by the first AND gate, the second AND gate, the first XOR gate, and the second XOR gate; and
connection of each gate to only one of the plurality of first duplicate registers or the plurality of second duplicate registers.

16. The method of claim 15, wherein a fault at any one of the first AND gate, the second AND gate, the first XOR gate, and the second XOR gate is detected because just one copy of the plurality of first duplicate registers or the plurality of second duplicate registers is corrupted by the fault.

17. The method of claim 15, wherein the SIFA attack is detected independent of the input to the Sbox.

18. The method of claim 12, wherein:
a Statistical Ineffective Fault Analysis (SIFA) attack is detected based on the first comparator and the second comparator detecting corruption in the plurality of first duplicate registers or the plurality of second duplicate registers; and
the SIFA attack is detected independent of the input to the Sbox.

19. The method of claim 18, wherein the corruption is detected on the MSB.

20. The method of claim 18, wherein the corruption is detected on the LSB.

* * * * *